United States Patent
Takasu et al.

(10) Patent No.: US 10,268,421 B2
(45) Date of Patent: Apr. 23, 2019

(54) INFORMATION RECORDING DEVICE AND INFORMATION RECORDING METHOD

(71) Applicant: PANASONIC INTELLECTUAL PROPERTY MANAGEMENT CO., LTD., Osaka (JP)

(72) Inventors: Toshiaki Takasu, Osaka (JP); Takahiro Yamada, Fukuoka (JP); Kenichi Tanaka, Fukuoka (JP); Hirotaka Endou, Fukuoka (JP); Kouretsu Boku, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 240 days.

(21) Appl. No.: 15/277,804

(22) Filed: Sep. 27, 2016

(65) Prior Publication Data
US 2017/0097789 A1    Apr. 6, 2017

(30) Foreign Application Priority Data

Oct. 2, 2015   (JP) .................................. 2015-196339
Jul. 19, 2016   (JP) .................................. 2016-141435

(51) Int. Cl.
*G06F 12/00*    (2006.01)
*G06F 13/00*    (2006.01)
(Continued)

(52) U.S. Cl.
CPC .......... *G06F 3/0677* (2013.01); *G06F 3/0604* (2013.01); *G06F 3/0643* (2013.01); *G06F 3/0652* (2013.01); *G06F 3/0631* (2013.01)

(58) Field of Classification Search
CPC ............................ G06F 3/0631; G06F 3/0677
(Continued)

(56) References Cited

U.S. PATENT DOCUMENTS

2005/0013217 A1   1/2005   Kuroda
2005/0091447 A1*  4/2005   Kuma ................ G11B 20/1883
                                                     711/112
(Continued)

FOREIGN PATENT DOCUMENTS

JP    03-046164      2/1991
JP    2004-111007 A  4/2004
(Continued)

*Primary Examiner* — Edward J Dudek, Jr.
*Assistant Examiner* — Sidney Li
(74) *Attorney, Agent, or Firm* — McDermott Will & Emery LLP

(57) ABSTRACT

An information recording device including a controller records information in a write-once optical disk group including one or a plurality of write-once optical disks. When recording new data, the controller calculates a residual quantity of an alternate area. The calculation of the residual quantity of the alternate area corresponds to a subtraction of a first consumption size and a second consumption size from a size of the alternate area of the write-once optical disk group. The first consumption size is a size of the alternate area already consumed when the data recorded in the write-once optical disk group was erased. The second consumption size is an estimated size of the alternate area to be consumed when the data recorded in the write-once optical disk group is erased. The controller records the new data when the residual quantity is greater than or equal to a third consumption size.

10 Claims, 16 Drawing Sheets

(51) Int. Cl.
*G06F 13/28* (2006.01)
*G06F 3/06* (2006.01)

(58) Field of Classification Search
USPC .......................................................... 711/114
See application file for complete search history.

(56) References Cited

U.S. PATENT DOCUMENTS

2005/0207262 A1    9/2005  Terada et al.
2006/0039246 A1*   2/2006  King ................. G11B 20/1883
                                                    369/30.01
2006/0140093 A1    6/2006  Akahoshi et al.

FOREIGN PATENT DOCUMENTS

| | | |
|---|---|---|
| JP | 2004-185656 A | 7/2004 |
| JP | 2004-280865 A | 10/2004 |
| JP | 2004-280991 A | 10/2004 |
| JP | 2005-038490 A | 2/2005 |
| JP | 2006-155744 A | 6/2006 |
| JP | 2007-184053 A | 7/2007 |
| JP | 2010-218665 A | 9/2010 |

* cited by examiner

FIG. 3

File information

| File ID | File name | Path | Erase flag | History flag |
|---|---|---|---|---|
| 001 | A.txt | ¥¥AA¥A.txt | 1 | 0 |
| 002 | B.bin | ¥¥BB¥B.bin | 0 | 0 |
| 003 | C.sh | ¥¥CC¥C.sh | 1 | 1 |
| 004 | C.1.sh | ¥¥CC¥trash box¥C.1.sh | 0 | 1 |
| 005 | D.txt | ¥¥DD¥D.txt | 0 | 0 |
| ... | ... | ... | ... | ... |

Erase flag (0: erase non-target, 1: erase target)
History flag (0: non-history file, 1: history file)

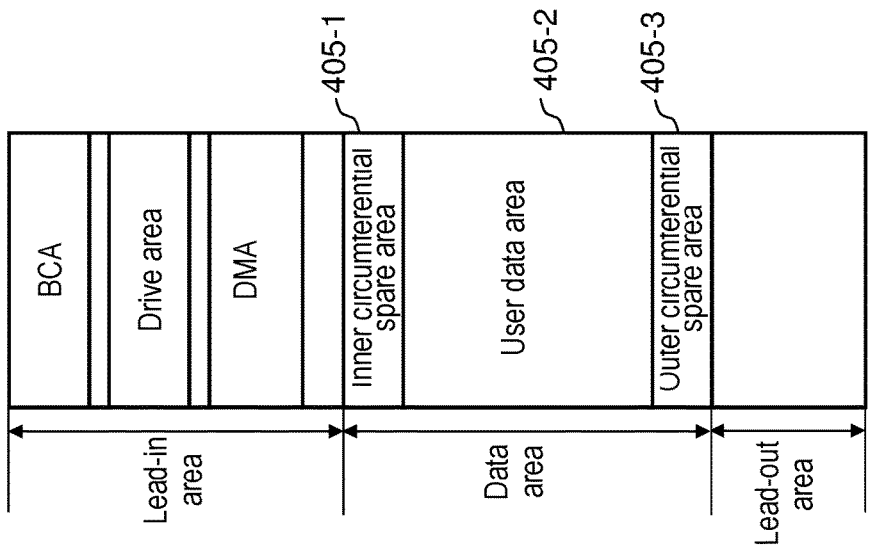
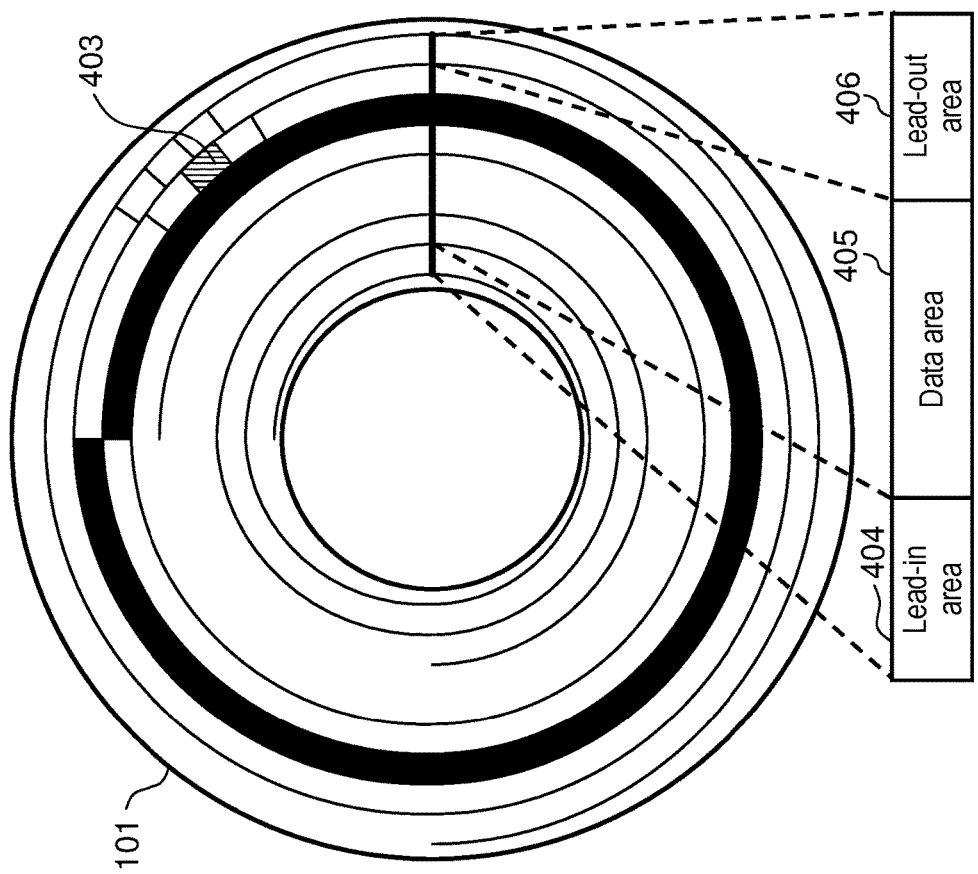

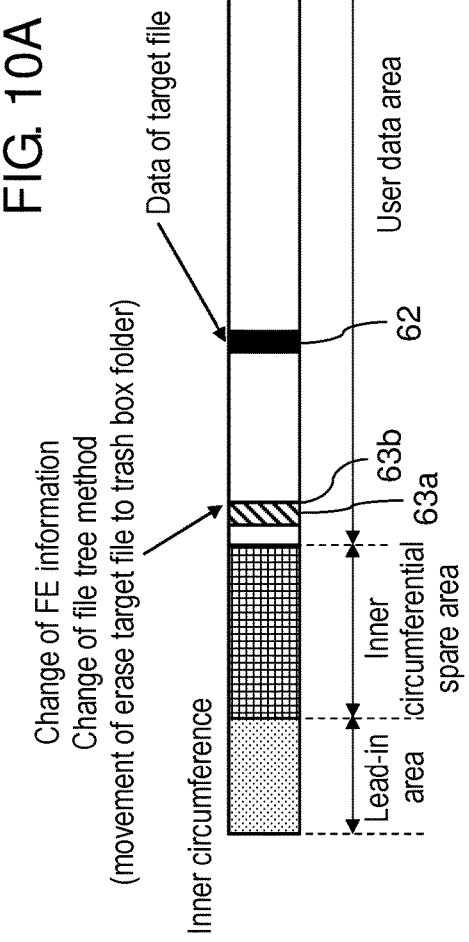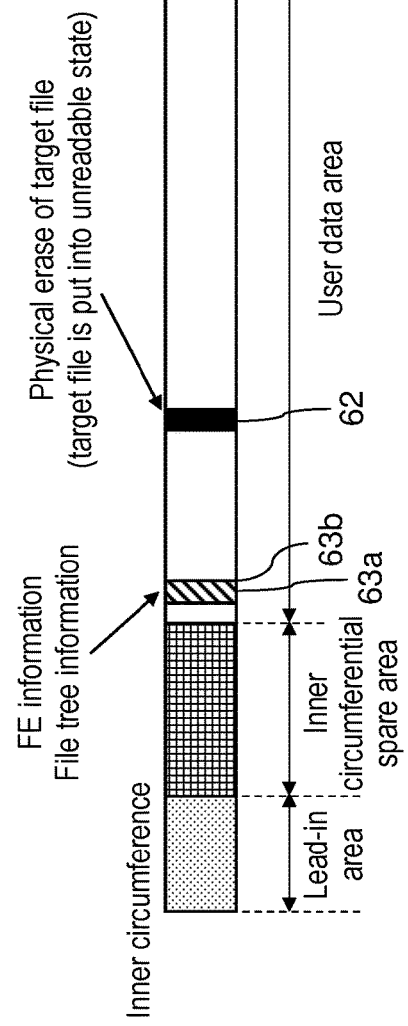

INFORMATION RECORDING DEVICE AND INFORMATION RECORDING METHOD

RELATED APPLICATIONS

This application claims the benefit of Japanese Application Nos. 2015-196339, filed on Oct. 2, 2015 and 2016-141435, filed on Jul. 19, 2016, the disclosures of which Applications are incorporated by reference herein.

BACKGROUND

1. Technical Field

The present disclosure relates to an information recording device and an information recording method that determines, when recording new data, whether target data to be recorded in a write-once optical disk can be erased from the optical disk after recording.

2. Description of Related Art

The write-once optical disk such as a DVD-R and a BD-R is a recording medium in which a recording mark once recorded cannot be rewritten. Unexamined Japanese Patent Publication No. 2005-038490 discloses an information recording and reproducing device that erases data recorded in the write-once optical disk.

The information recording and reproducing device of Unexamined Japanese Patent Publication No. 2005-038490 includes data processing means which generates processing data in which recording data to be recorded in the recording medium is processed and restoration data which is necessary for restoration of the recording data from the processing data. The information recording and reproducing device also includes recording means which separately records the recording data in different positions on the recording medium as the processing data and the restoration data and erase means which puts the restoration data recorded in the recording medium into an unreadable state when the recording data is erased. Therefore, in the configuration of the information recording and reproducing device, the data recorded in the write-once recording medium can be erased such that the data is completely unreadable.

SUMMARY

The present disclosure provides an information recording device and an information recording method that determines, when recording new data, whether target data to be recorded in a write-once optical disk group can be erased from the optical disk group after recording.

A first aspect of the present disclosure discloses an information recording device that records information in a write-once optical disk group. The write-once optical disk group includes one or a plurality of write-once optical disks. The information recording device calculates a residual quantity of an alternate area, the calculation of the residual quantity of the alternate area corresponding to a subtraction of a first consumption size that is a size of the alternate area already consumed when the data recorded in the write-once optical disk group was erased and a second consumption size that is an estimated size of the alternate area to be consumed when the data recorded in the write-once optical disk group from a size of the alternate area of the write-once optical disk group is erased. When recording new data in the write-once optical disk group, the information recording device assumes that the new data is erased after recorded in the write-once optical disk group, and calculates a third consumption size that is an estimated size of the alternate area to be consumed when the new data is erased after recorded in the write-once optical disk group. The information recording device compares the residual quantity of the alternate area and the third consumption size to each other, and records the new data when the residual quantity is greater than or equal to the third consumption size.

BRIEF DESCRIPTION OF THE DRAWINGS

FIG. 3 is a view illustrating a data structure of file information in a database;

FIG. 4A is a view illustrating a logical configuration of an optical disk;

FIG. 4B is a view illustrating the logical configuration of the optical disk;

FIG. 10A is a view illustrating the state change on the disk during file erase;

FIG. 10B is a view illustrating the state change on the disk during the file erase;

DETAILED DESCRIPTION

Hereinafter, an exemplary embodiment will be described in detail with reference to the drawings. However, the detailed description more than necessary is occasionally omitted. For example, the detailed description of an already known item or the overlapping description of a substantially identical configuration is occasionally omitted. This is because unnecessary redundancy of the following description is avoided to facilitate understanding of those skilled in the art.

The inventors provide the accompanying drawings and the following description in order that those skilled in the art fully understand the present disclosure, but it is noted that claims are not limited to the drawings and the description.

Figure 1:
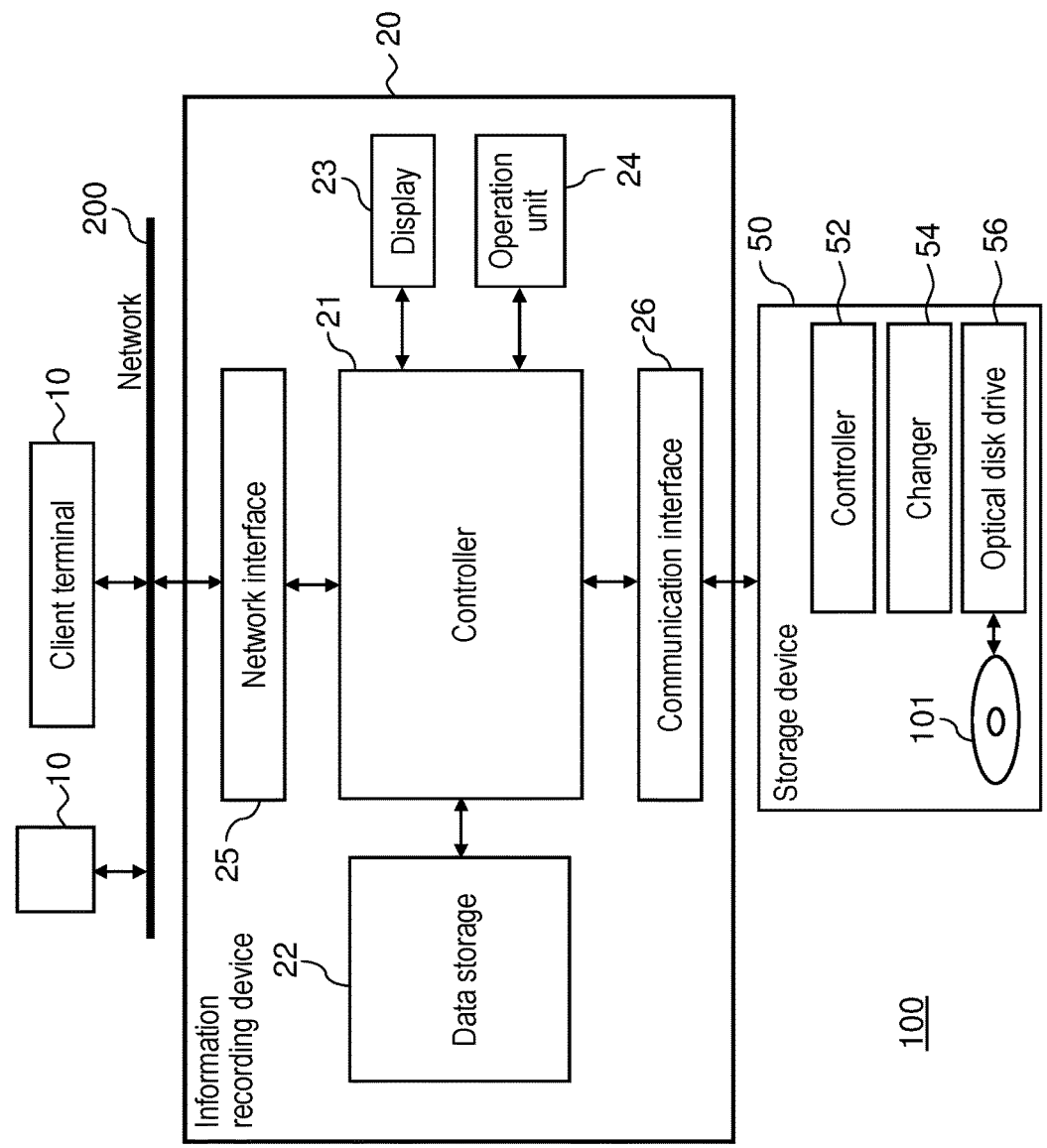
FIG. 1 is a hardware block diagram illustrating an information recording device according to a first exemplary embodiment.

First Exemplary Embodiment (1-1. Configuration)
(1-1-1. Information Recording Device)
FIG. 1 is a view illustrating a configuration of information recording system 100 according to a first exemplary embodiment. Referring to FIG. 1, information recording system 100 includes information recording device 20 and storage device 50. Information recording system 100 is connected to client terminal 10 through network 200.

Client terminal 10 is a computer that uses a function or data provided from information recording system 100 according to a user operation. According to the user operation, client terminal 10 issues a command to record a file (data) in storage device 50 or a command to read the file (data) recorded in storage device 50 to information recording system 100.

According to the command received from client terminal 10, information recording device 20 controls storage device 50 to record and read the data in and from a recording medium (optical disk) of storage device 50.

Information recording device 20 includes controller 21 that controls entire operation of information recording device 20, display 23 that displays various pieces of information, operation unit 24 that receives the user operation, and data storage 22 in which data and a program are stored. Information recording device 20 also includes communication interface 26 that allows a connection to an external device and network interface 25 that allows a connection to network 200.

For example, display 23 includes a liquid crystal display or an organic EL display. Operation unit 24 includes various components, such as a keyboard, a mouse, a touchpad, and a button, which are operated by the user.

Communication interface 26 is a circuit (module) that connects storage device 50 to information recording device 20. Communication interface 26 conducts communication pursuant to communication standards such as SAS (Serial Attached SCSI).

Network interface 25 is a circuit (module) that connects information recording device 20 to a network (such as a LAN and a WAN) through a wireless or wired communication line. Network interface 25 conducts communication pursuant to communication standards such as IEEE 802.3, IEEE 802.11a/11b/11g/11ac, and WiFi.

Data storage 22 is a recording medium in which a parameter, data, and a control program necessary for implementation of a predetermined function are stored, and data storage 22 includes a hard disk drive (HDD). Data storage 22 may include a semiconductor storage device (SSD). As described later, a database (to be described later) is stored in data storage 22, and data storage 22 also acts as a cache (to be described later) in which the data to be recorded in the optical disk and the data read from the optical disk are temporarily stored.

Controller 21 includes a CPU or a MPU, and executes a control program (software) to implement a predetermined function. For example, the control program is stored in data storage 22.

Information recording device 20 includes a RAM (not illustrated) including a semiconductor device such as a DRAM and an SRAM. The data is temporarily stored in the RAM, and the RAM also acts as a working area of controller 21.

Storage device 50 is a device that accommodates optical disk 101 of the recording medium, and records and reproduces the data in and from optical disk 101 under the control of information recording device 20. Storage device 50 includes controller 52, changer 54, and optical disk drive 56. Controller 52 controls entire operation of storage device 50. Controller 52 includes a CPU or a MPU, and executes a control program (software) to implement a predetermined function. Alternatively, the function of controller 52 may be implemented by controller 21. Optical disk drive 56 is a device that writes and reads the data in and from optical disk 101. Changer 54 is a device that loads optical disk 101 on optical disk drive 56. The optical disk is a write-once optical disk such as a DVD-R and a BD-R.

Figure 2:
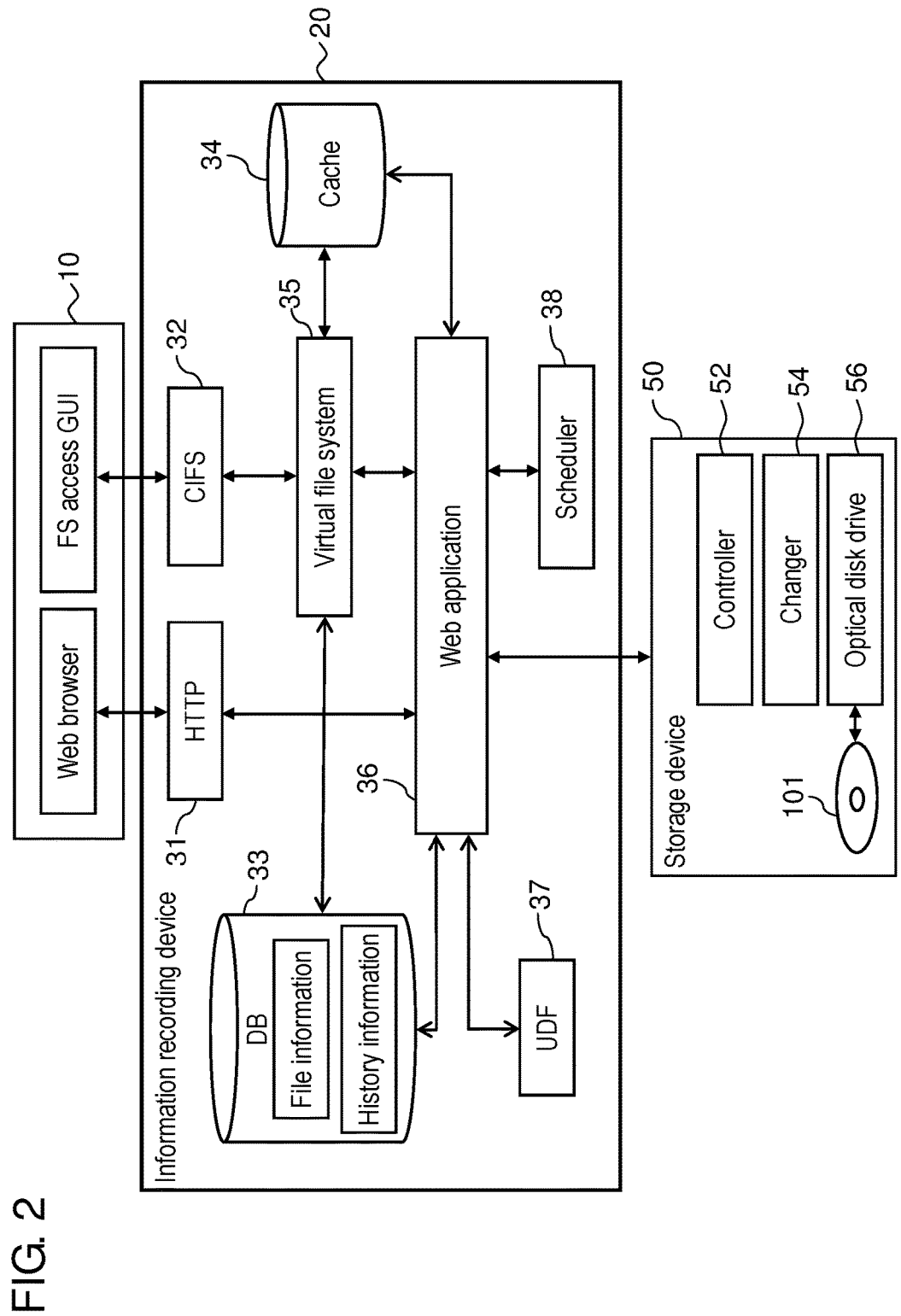
FIG. 2 is a functional block diagram illustrating the information recording device of the first exemplary embodiment.

FIG. 2 is a view a functional configuration of the information recording device 20. Controller 21 executes the control program to implement each block (function) of information recording device 20 in FIG. 2.

Client terminal 10 receives the user operation with a Web browser as a GUI. For example, the Web browser is Internet Explorer (product of Microsoft). The user can perform the user operation (instruction) to record, move, and reproduce the data through the GUI with respect to information recording system 100 (optical disk 101). In this case, client terminal 10 transmits information to information recording system 100 based on an HTTP (Hypertext Transfer Protocol). Using the user interface (GUI) for accessing a file system (FS), client terminal 10 can issue an instruction to information recording system 100 (optical disk 101) to record or erase the data. In this case, client terminal 10 transmits a command based on a CIFS (Common Internet File System) to information recording device 20.

HTTP module 31 is a function of receiving the information, which is transmitted from client terminal 10 in pursuant to the HTTP protocol. CIFS module 32 is a function of receiving the CIFS-based command and data that are received from client terminal 10. For example, an erase command to erase the file may be received through HTTP module 31, and a command to update (rewrite) the file may be received through CIFS module 32.

Cache 34 is measures for temporarily storing the data to be written in optical disk 101 and the data read from optical disk 101. Cache 34 is implemented by data storage 22.

Virtual file system 35 is a file system that manages the file (data) stored in cache 34. Virtual file system 35 is a file system that logically manages a state of the file on optical disk 101, the state of the file being scheduled to be changed on the basis of the instruction from client terminal 10, but not actually changed yet.

Web application 36 is a function of performing the following main operation of information recording device 20.

UDF (Universal Disk Format) 37 is a file system that manages the file (data) recorded in optical disk 101.

Scheduler 38 is a function of performing file synchronization processing (to be described in detail later) on optical disk 101 according to a schedule. For example, a manager sets the schedule, and a time period (a starting clock time and an ending clock time) in which the synchronization processing is performed is set with respect to optical disk 101. The synchronization processing is performed on optical disk 101 according to the set schedule in order to reflect the pieces of data, which are stored in virtual file system 35 and cache 34, in optical disk 101. In the first exemplary embodiment, physical erase processing is also performed in the synchronization processing of scheduler 38.

Database (DB) 33 manages file information including information about a history of the file recorded in optical disk 101 and history information. For example, the file information manages whether the file recorded in optical disk 101 is scheduled to be erased. The file information also manages whether the file recorded in optical disk 101 is a history file. As used herein, the history file means a file that is invalid because of the update or erase of the file while being valid in past times. The file information also manages whether the file recorded in optical disk 101 is a synchronized file. As used herein, the synchronization means that the state managed by virtual file system 35 is reflected in optical disk 101 with respect to a certain file. The history information means information managing a correspondence between a certain file and the history file associated with the file, information about the physically-erased file, and information including a file scheduled to be physically erased future.

FIG. 3 illustrates a configuration example of the file information stored in database 33. The file information manages a file ID, a file name, a path indicating a storage place of the file, an erase flag, and a history flag in each file recorded in optical disk 101. The erase flag is a flag indicating whether the file should be erased. A value "0" of the erase flag indicates that the file is not an erase target, a value "1" indicates that the file is the erase target, and a value "2" indicates that the file is already erased. The history flag is a flag indicating whether the file is the history file. The value "0" of the history flag indicates that the file is not the history file, and the value "1" indicates that the file is the history file.

(1-1-2. Optical Disk)

FIGS. 4A and 4B are views illustrating a logical configuration of the optical disk. Optical disk 101 is a write-once recording medium. FIG. 4A is a view illustrating areas of optical disk 101. Disc-shaped optical disk 101 includes at least one recording layer in which the information can be recorded and reproduced. In the recording layer, a groove is spirally formed from a center, and a track is formed in one of a groove and a land (an area between the grooves). Each track includes a plurality of finely-divided blocks 403. The groove of the track is formed in a wobbling manner, and address information (hereinafter, referred to as a "physical address") indicating a detailed position on the disk is contained in the wobbling. The tracks may be provided in both the groove and the land to record the information, whereby recording density of the track could be improved.

For example, a Blu-ray (registered trademark) disk (BD) has a track width (track pitch) of 0.32 μm.

Block 403 is a unit of error correction, and is a minimum data unit in which the recording or reproducing operation is performed. For example, block 403 becomes is 32K bytes for the DVD, and becomes is 64K bytes (=1 cluster) for the BD. When expressed in terms of sector (2K bytes) that is of a data-management minimum unit of optical disk 101, 1 cluster=32 sectors. Hereinafter, the "cluster" and the "block" are used as the same meaning.

Optical disk 101 includes lead-in area 404, data area 405, and lead-out area 406. FIG. 4B is a view illustrating an area structure of optical disk 101. Data area 405 includes user data area 405-2, inner spare area 405-1, and outer spare area 405-3. User data is recorded in user data area 405-2. Each of inner spare area 405-1 and outer spare area 405-3 includes an alternate area that is used in alternate recording of a defective area detected in user data area 405-2.

Each of lead-in area 404 and lead-out area 406 includes an area where management information necessary for the recording and reproduction of the data in and from optical disk 101 is mainly recorded. Lead-in area 404 and lead-out area 406 act as a margin area where, even if optical head 103 overruns, optical head 103 can follow the track when accessing an edge of data area 405.

Lead-in area 404 is an area where the recording and reproduction are performed as needed. In lead-in area 404, unlike user data area 405-2, the user cannot directly perform the recording and reproduction. Lead-in area 404 includes a BCA (Burst Cutting Area), a drive area, and a DMA (Defect Management Area).

The BCA is a pre-recording area, which is formed on a barcode using a special device at a production stage of optical disk 101 while including disk-associated information or information unique to each disk. For example, the BCA is an area obtained by removing a reflection film using a laser. For example, information about a serial number unique to each optical disk 101 is stored in the BCA.

The drive area is an area where information recording system 100 (storage device 50) can freely record information necessary for its own control.

The management information area is an area in which the management information such as information about an area structure of data area 405 of optical disk 101, information about a defective block, and information indicating the recording state of optical disk 101 can be recorded.

Lead-in area 404 of optical disk 101 may further include an OPC (Optimum Power Control) area where recording power of optical disk drive 56 is adjusted and a pre-write area where tracking and focusing are adjusted.

(1-2. Operation)

The operation of information recording system 100 having the above configuration will be described below. When receiving the user operation to record and reproduce the file with respect directed to information recording system 100, client terminal 10 transmits information (hereinafter, referred to as a "command") indicating the user operation to information recording device 20. Information recording device 20 of information recording system 100 receives the command from client terminal 10. Controller 21 of information recording device 20 issues an instruction to storage device 50 according to the received command. According to the instruction from information recording device 20, storage device 50 (controller 52) records and reproduces the data in and from optical disk 101.

(1-2-1. Synchronization Processing)

When adding a new file to optical disk 101 of the recording medium or partially rewriting (updating) or erasing the file according to the command from the client terminal, information recording system 100 records the data (file) to be recorded or updated on cache 34 before the file is added to optical disk 101.

Initially all the pieces of data recorded in optical disk 101 are loaded on cache 34. Then, the file is added, updated, or erased on cache 34 according to the command received from client terminal 10. Virtual file system 35 manages the file on cache 34. Then, processing (hereinafter, referred to as "synchronization processing") of reflecting virtual file system 35 and the state of the data on cache 34 in optical disk 101 is performed. The storage state of the file (data) managed by virtual file system 35 is reflected in optical disk 101 through the synchronization processing, and optical disk 101 reaches the state in which the file is added, updated, or erased according to the command from client terminal 10.

Thus, when receiving the command from client terminal 10, information recording system 100 temporarily updates the data on cache 34 and then performs the synchronization processing on optical disk 101, thereby reflecting a content of cache 34 in optical disk 101. In the case that the command is received multiple times, the data on cache 34 is updated the multiple times, and then the synchronization processing is performed on optical disk 101 only once. Therefore, the processing performed according to the command received the multiple times can be reflected in optical disk 101. Accordingly, a frequency of loading optical disk 101 on optical disk drive 56 can be reduced, and efficiency of the processing of performing the recording on optical disk 101 can be improved.

(1-2-2. File Update)

In the first exemplary embodiment, because optical disk 101 is the write-once optical disk, the data temporarily recorded in optical disk 101 cannot be updated (rewritten) or erased at the same physical position on optical disk 101. The processing of updating the file with respect to optical disk 101 in information recording system 100 will be described below.

Information recording device 20 of information recording system 100 receives an update command from client terminal 10 in order to partially rewrite the content of the file. The file name of the file to be updated, the position of the data to be updated, a length of the data to be updated, and the data to be updated are specified in the update command.

When receiving the update command from client terminal 10, information recording device 20 updates virtual file system 35 while updating the data on cache 34 according to the update command.

Then, information recording device 20 performs the synchronization processing on optical disk 101 in order to reflect cache 34 and the state of the file managed by virtual file system 35 in optical disk 101.

Figure 5:
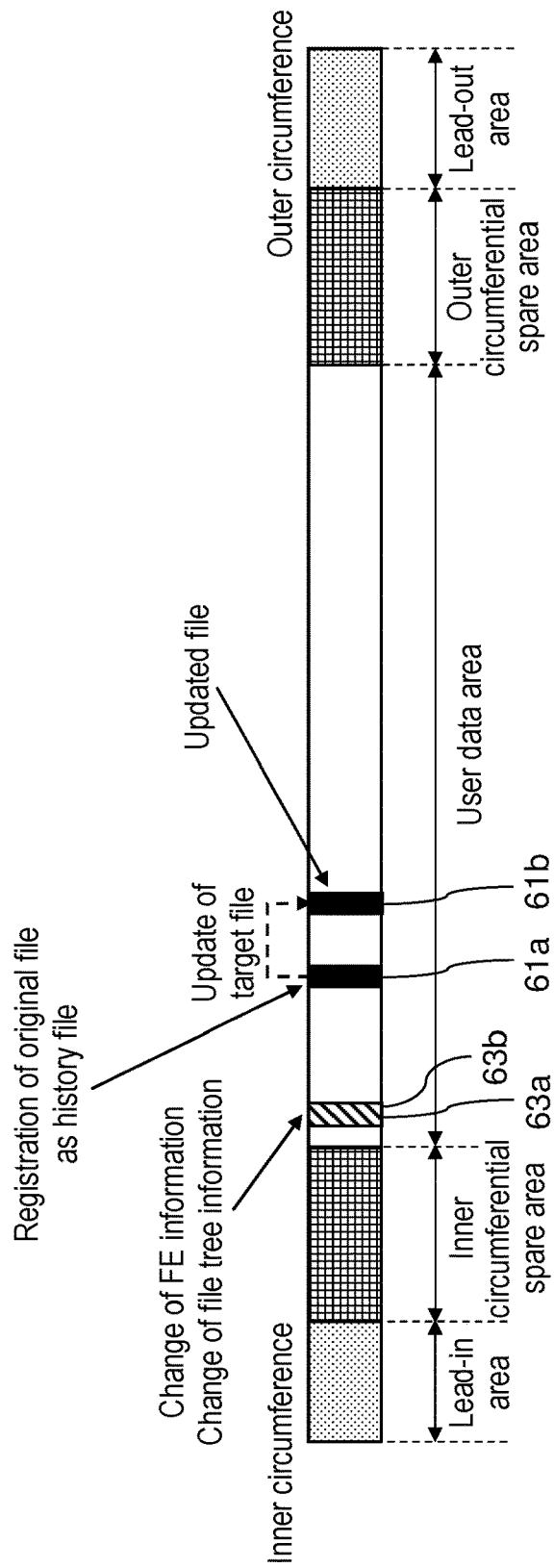
FIG. 5 is a view illustrating a state change on the disk during file update.

The processing on the optical disk 101 in updating (rewriting) the file (hereinafter, referred to as a "target file") already recorded in the user data area of optical disk 101 will specifically be described with reference to FIG. 5.

In the case that target file 61a is updated, file 61a is updated (rewritten) according to the update command to generate a new file (hereinafter, referred to as an "updated file") 61b. Updated file 61b is recorded in a free space (an area different from the area where original file 61a is recorded) of the user data area. At this point, because a recording place of updated file 61b is changed, a content of file entry (FE) information in the file system that manages the file in optical disk 101 is rewritten, and rewritten file entry information 63a is recorded in a predetermined free space (an area different from original file entry information) of the user data area.

Target file 61a that is of the original of updated file 61b is renamed, and a storage place of the target file 61a is changed from a current folder to a trash box folder. The trash box folder is an example of a folder in which a logically invalid file caused by the erase is stored. That is, the data of renamed original target file 61a still remains on optical disk 101. The data of original target file 61a is managed as the "history file" on database 33. The file tree information about the history file (original target file 61a) is changed so as to be stored in the trash box folder, and changed file tree information 63b is recorded in the free space. At this point, the user can check the history file (original target file 61a) by referring to the trash box folder in optical disk 101.

A correspondence between updated file 61b and the history file (original target file 61a) associated with updated file 61b is managed by the history information in database 33. A plurality of pieces of file entry information and a plurality of pieces of file tree information in optical disk 101 are generated together with the update of the file. Information indicating the latest file entry information and file tree information is stored in, for example, the lead-in area of optical disk 101 as the management information (not illustrated).

Thus, in information recording device 20, the pre-update file is changed to the history file by the update of the file, and the history file is stored in the trash box folder.

Figure 6:
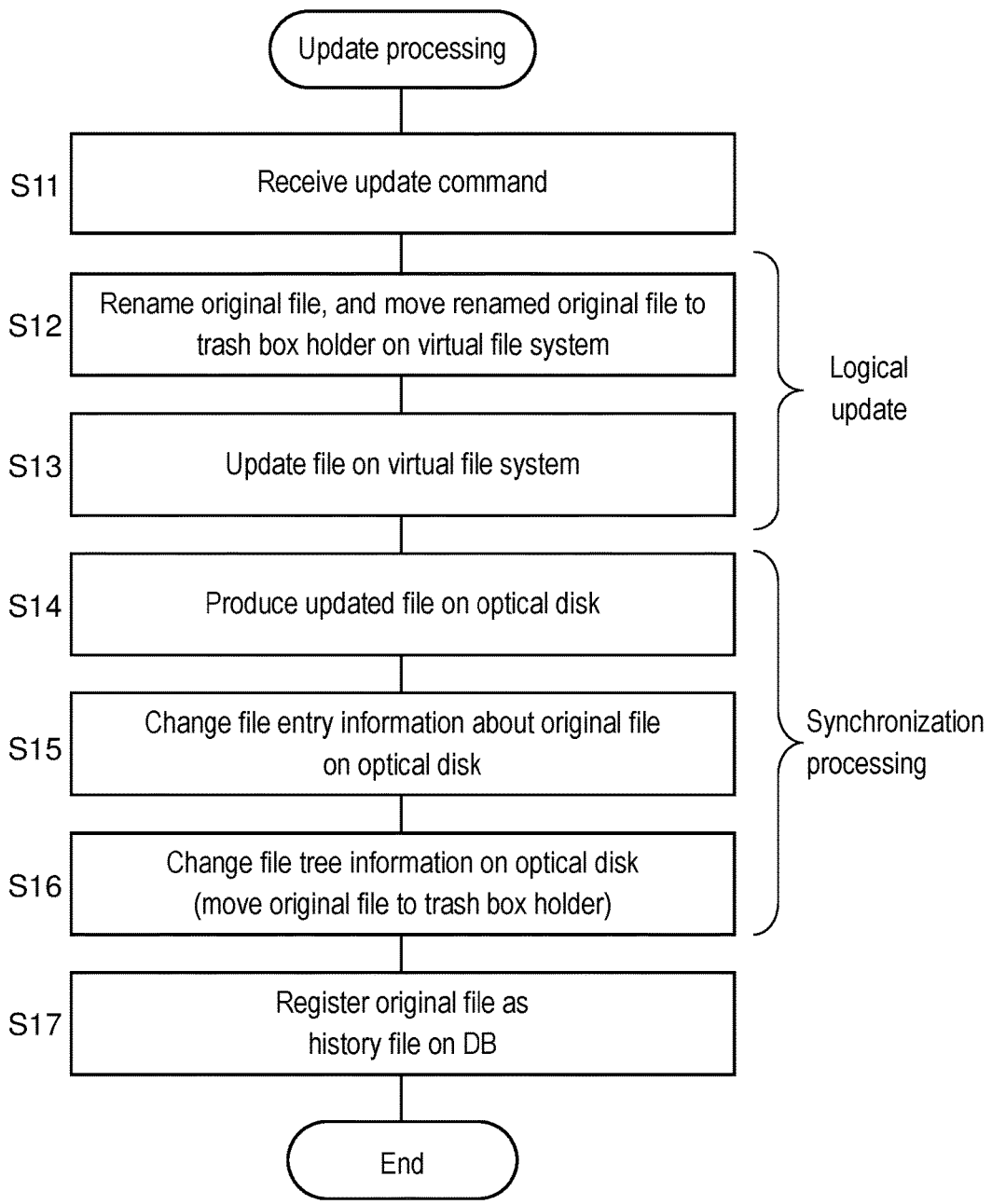
FIG. 6 is a flowchart illustrating file update processing.

A flow of the processing of updating the file recorded in optical disk 101 will be described below with reference to a flowchart in FIG. 6.

When receiving the update command from client terminal 10 (S11), controller 21 of information recording device 20 updates the file according to the update command, and updates cache 34 and virtual file system 35 (S12 and S13). Specifically, controller 21 renames the file name of the file (original file) specified as an update target, and updates virtual file system 35 such that the renamed original file is stored in the trash box folder (S12). Controller 21 newly adds the updated file to cache 34 and virtual file system 35 in response to the updated command (S13).

The reception of the update command for the file having a file name "C.sh" stored in a folder "¥¥CC" will be described by way of example. Controller 21 renames the file name "C.sh" of the update target file to "C.1.sh", and moves the original file having the renamed file name "C.1.sh" to the trash box folder. According to the command, controller 21 updates the update target file to generate new data (file), and adds the newly-generated data (file) to cache 34 and virtual file system 35 as the updated file of the file name "C.sh". Therefore, on cache 34, the data updated by the file name "C.sh" is recorded in the folder "¥¥CC", and the original file having the file name "C.sh.1" is recorded in the trash box folder.

Then, the synchronization processing is performed to synchronize (establish consistency) the logical state of optical disk 101, which is managed by virtual file system 35, with the actual physical state of optical disk 101. The synchronization processing may be performed at timing arbitrarily specified by the user, continuously performed after the processing of updating virtual file system 35, or performed at a clock time set by the function of scheduler 38.

In the synchronization processing, controller 21 issues an instruction to storage device 50 to record the updated file in optical disk 101 on the basis of the file state managed by virtual file system 35 and cache 34 (S14). Therefore, for example, the data of updated file 61b is recorded in the free space (the area different from the area where original file 61a is recorded) of optical disk 101 as illustrated in FIG. 5.

Then, controller 21 changes the file entry information about the original file on optical disk 101 (S15). Specifically, controller 21 changes the file entry information such that the file name of the original file is renamed, and such that the storage place of the original file is changed to the trash box folder. The changed file entry information is recorded in the area different from the original file entry.

Controller 21 changes the file tree information about the original file (S16). That is, controller 21 changes the file tree information about the original file such that the original file is stored in the trash box folder, and the changed file tree information is recorded in the area different from the original file tree information.

Controller 21 registers the original file as the history file in database 33 (S17). For example, in the case that the original file of the file name "C.sh" is updated in FIG. 3, the file name of the original file is changed to "C.1.sh", the storage place of the original file is changed to the trash box folder (¥¥CC¥trash box¥C.1.sh), the history flag is set to "1", and the original file is registered in database 33.

Thus, the entity data of the updated file is newly recorded in optical disk 101, and the pre-update original file is moved to the trash box folder while the file name of the pre-update original file is changed. At this point, using client terminal 10, the user can check whether the original file exists in the trash box folder by browsing the trash box folder of optical disk 101 through virtual file system 35 or UDF.

(1-2-3. File Erase)

The file erase performed with information recording system 100 will be described below. When receiving the erase command from client terminal 10, information recording device 20 of information recording system 100 logically erases an erase target file. As used herein, the logical erase means that the storage place of the file is moved to the trash box folder on virtual file system 35. Because the entity data of the file effectively exists on optical disk 101 in the state in which the file is logically erased, the data of the file can be reproduced (read).

Figure 7:
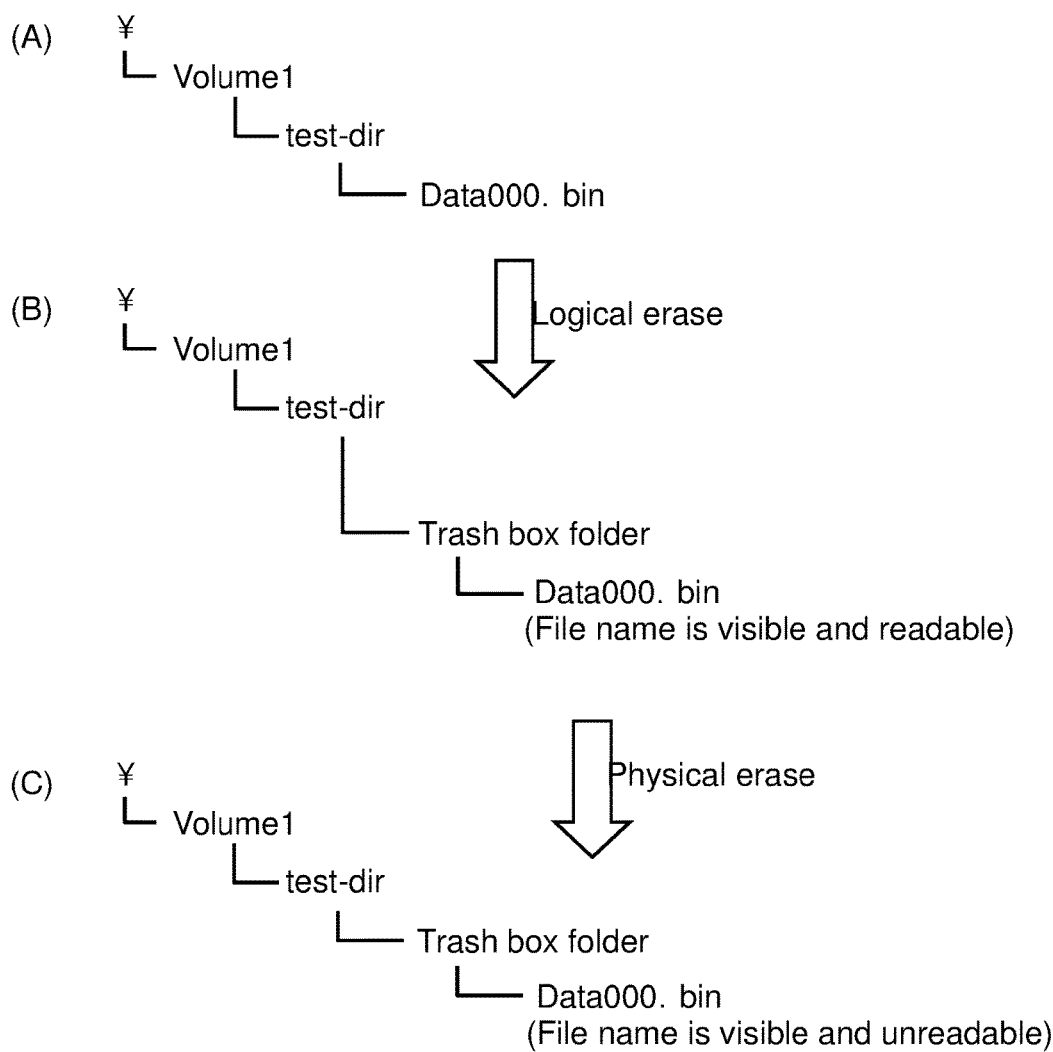
FIG. 7 is a view illustrating a directory configuration change associated with file erase.

In the logical erase, information recording device 20 moves the erase target file to the trash box folder on virtual file system 35, and sets the erase flag to "1" for the erase target file and the history file associated with the erase target file (hereinafter, simply referred to as "the erase flag is set to 1"). For example, in the case that the erase command to erase the file of Data000.bin is received while the file of Data000.bin in the directory of test-dir is stored as illustrated in (A) of FIG. 7, the file of Data000.bin is logically erased and moved to the trash box folder as illustrated in (B) of FIG. 7. In this state, the user can check the existence and content of the file of Data000.bin by browsing the trash box folder.

Then, information recording device 20 performs the synchronization processing on the optical disk 101 to reflect the disk state managed by virtual file system 35 in optical disk 101. Therefore, on optical disk 101, the erase target file is moved to the trash box folder together with the history file of the erase target file. Then, information recording device 20 performs physical erase on the file to which the erase flag is set. As used herein, the physical erase means that the data of the erase target file is overwritten so as to become unreproducible. After the physical erase, although the user can check the existence of the erased file by browsing the trash box folder, the user can hardly reproduce (read) the data of the erased file. For example, as illustrated in (C) of FIG. 7, when the file of Data000.bin is physically erased, although the file name of the file of Data000.bin can be checked in the trash box folder, the data is unreadable (that is, substantially erased). However, on the virtual file system, the existence of the physically-erased file may be uncheckable. The erase flag is set to "2" for the physically-erases file and the physically-erased history file associated with the physically-erases file (hereinafter, simply referred to as "the erase flag is set to 2").

Figure 8:
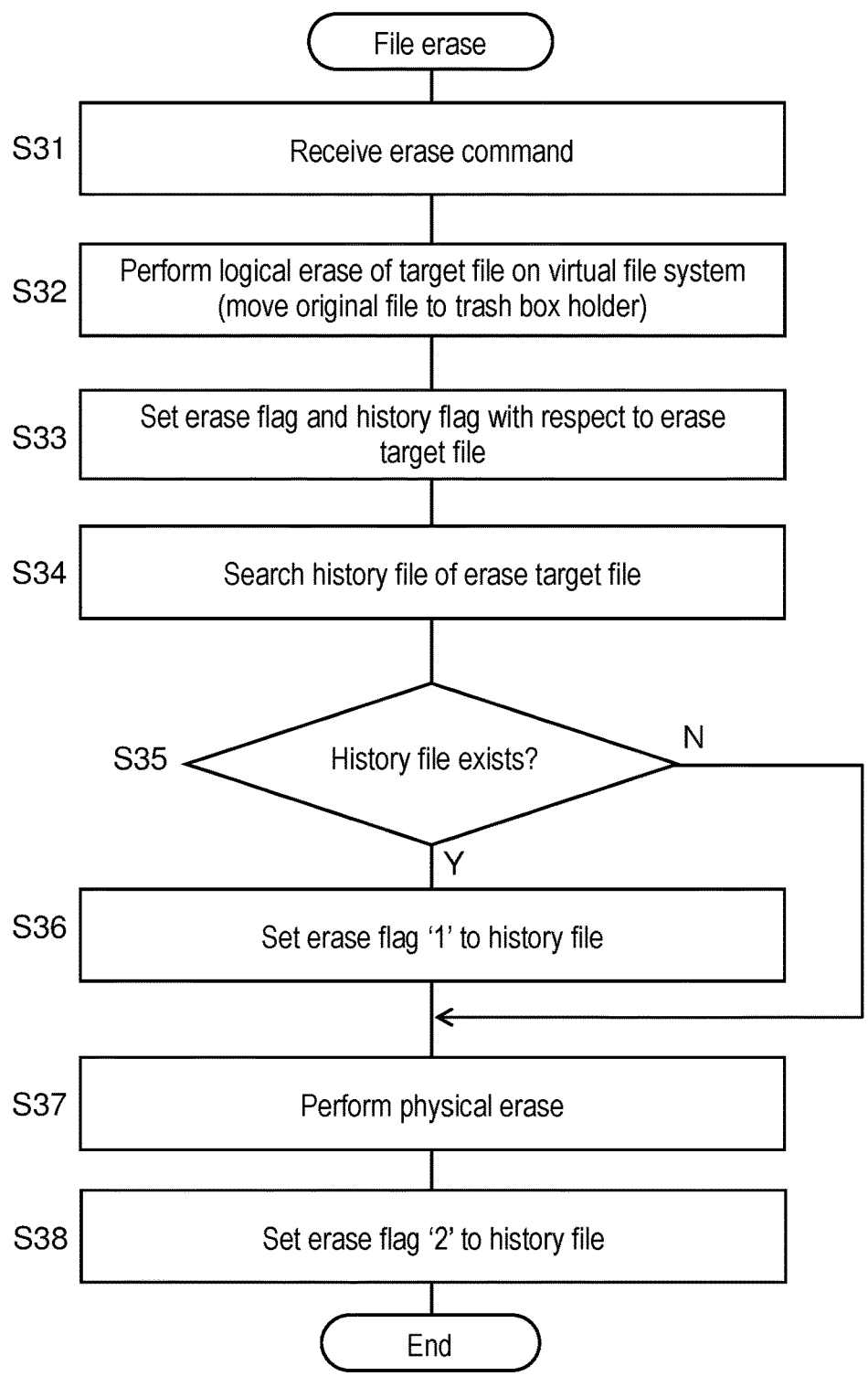
FIG. 8 is a flowchart illustrating file erase processing.

FIG. 8 is a flowchart illustrating a flow of the file erasing processing. The erasing processing performed with information recording device 20 will more specifically be described with reference to the flowchart in FIG. 8.

When receiving the erase command in which the erase target file is specified from client terminal 10 (S31), controller 21 of information recording device 20 logically erases the erase target file on virtual file system 35 (S32). Specifically, on virtual file system 35, the erase target file is moved to the trash box folder from the folder in which the erase target file is currently stored.

Then, controller 21 sets the erase flag of the erase target file on the file information in database 33 (that is, the erase flag is set to "1 (erase target)") (S33). The history flag of the erase target file is also set (that is, the history flag is set to "1 (history file)") (S33).

Controller 21 refers to the history information in database 33 to search the history file associated with the erase target file (S34). When at least one history file is searched (YES in S35), controller 21 sets the erase flag to the searched history file on the file information in database 33 (S36).

Thus, in receiving the erase command, the erase target file is moved to the trash box folder on virtual file system 35, and the erase flag and the history flag are set. The erase flag is also set to "1" for the history file associated with the erase target file. In this state, only the logical erase is performed on virtual file system 35. Then, controller 21 performs the physical erase (S37).

Figure 9:
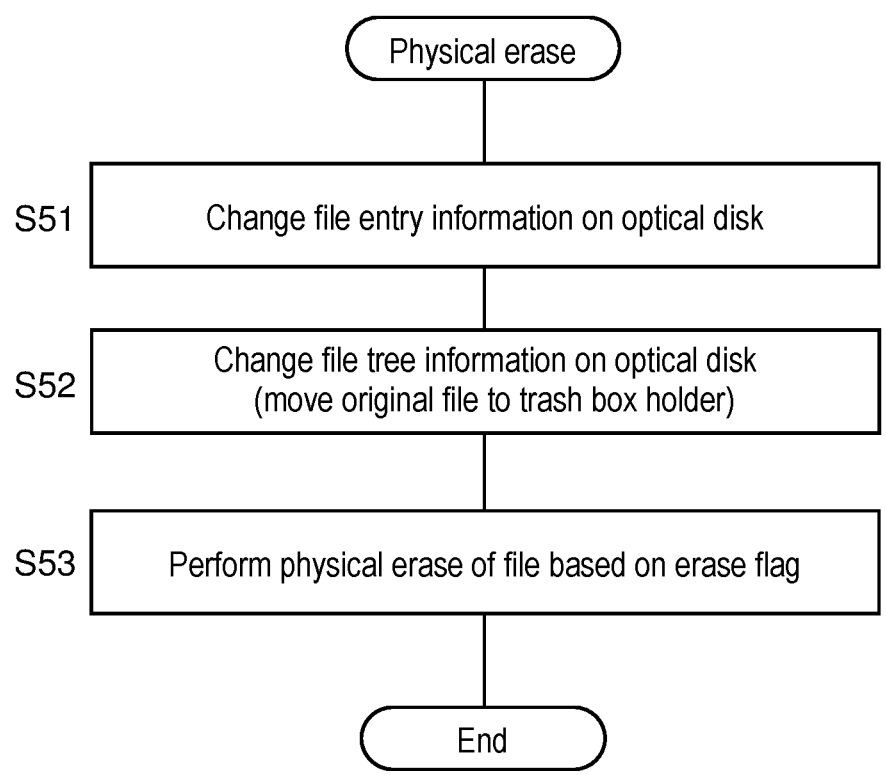
FIG. 9 is a flowchart illustrating processing of performing physical erase of a file.

The physical erase operation performed with information recording device 20 will be described below with reference to a flowchart in FIG. 9. The physical erase is performed on the basis of the timing arbitrarily specified by the user or the previously-set schedule.

On the basis of virtual file system 35, controller 21 of information recording device 20 issues an instruction to controller 52 of storage device 50 to change the file entry information on optical disk 101 (S51). Additionally, on the basis of virtual file system 35, controller 21 of information recording device 20 issues an instruction to controller 52 of storage device 50 to change the file tree information on optical disk 101 (S52). That is, controller 21 of information recording device 20 issues the instruction to controller 52 of storage device 50 to change the file tree information such that the storage place of the erase target file becomes the trash box folder.

Controller 52 of storage device 50 changes the file entry information and the file tree information on the basis of the instruction from controller 21 of information recording device. As illustrated in FIG. 10A, on optical disk 101, controller 52 of storage device 50 records changed file entry information 63a and changed file tree information 63b in the area different from the area where the original file entry information and original file tree information are stored. At this point, the entity data of the erase target file is not changed.

Then, controller 21 of information recording device 20 refers to the file information in database 33, and issues an instruction to controller 52 of storage device 50 to physically erase the file for which the erase flag is set to "1" (S53). In response to the instruction, controller 52 of storage device 50 physically erases the file on optical disk 101.

Figure 11:
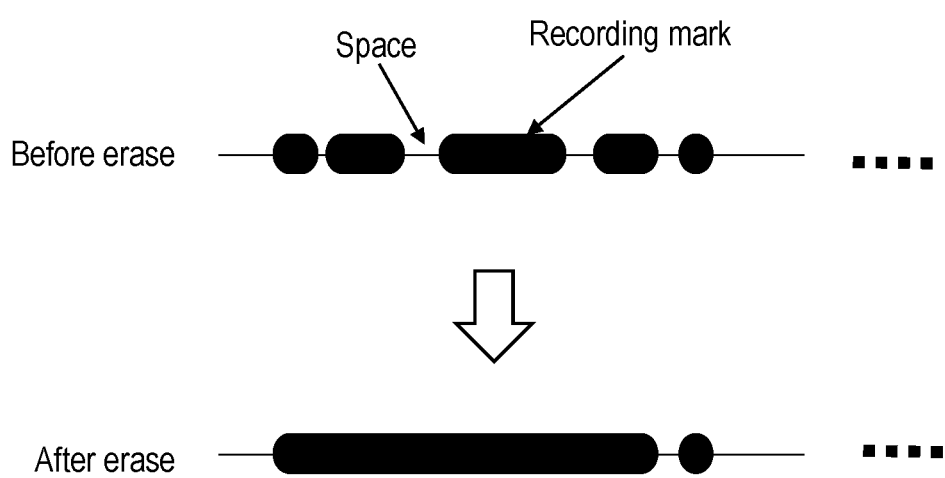
FIG. 11 is a view illustrating the physical erase of the file in a recording layer of a write-once optical disk.

The physical erase is performed by putting the file to be erased into the unreproducible state. For example, the file to be erased is put into the unreproducible state by overwriting at least part of the data of the file using a predetermined erase pattern. That is, the file to be erased is put into the unreproducible state by overwriting at least one of the entity data, synchronization data, and error correction data of the file using the predetermined erase pattern. For example, as illustrated in FIG. 11, the overwrite is performed by deforming a recording mark constituting the data of the file to be erased into a longer recording mark in the recording layer of optical disk 101. The file can hardly be read hereafter by deforming the recording mark, and the file is substantially erased.

Thus, the physical erase is performed on the file for which the erase flag is set to "1", and then the erase flag is set to "2". Hereinafter, the file on which the physical erase is already performed can hardly be read. The physical erase may be performed in timing arbitrarily specified by the user, in previously-scheduled timing, or at the same time as the performance of the synchronization processing.

Figure 12:
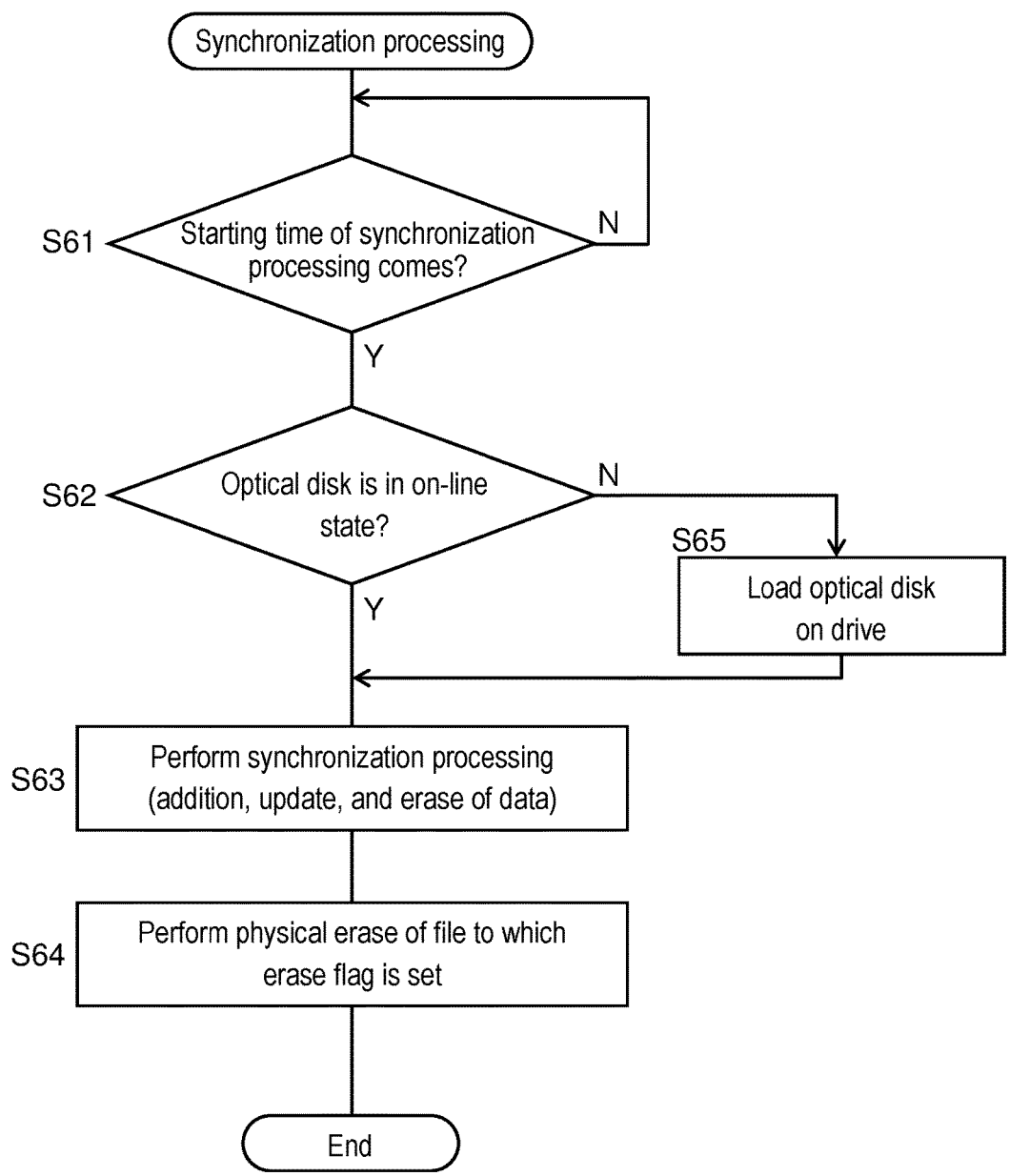
FIG. 12 is a flowchart illustrated scheduled synchronization processing and the physical erase processing performed in association therewith.

The physical erase processing in the synchronization processing performed in the previously-scheduled timing will be described below with reference to FIG. 12.

Using the function of scheduler 38, controller 21 determines whether a current clock time reaches a clock time the synchronization processing is started (S61). When it is determined that the current clock time reaches the clock time the synchronization processing is started (Y in S61), controller 21 starts the synchronization processing.

Controller 21 checks whether optical disk 101 is in an on-line state with respect to storage device 50 (that is, whether optical disk 101 is loaded on optical disk drive 56) (S62). When optical disk 101 is not in the on-line state (N in S62), controller 21 issues an instruction to storage device 50 to load optical disk 101 on optical disk drive 56 (S65).

Then, controller 21 performs the synchronization processing on optical disk 101 according to virtual file system 35 and cache 34 (S63). In the synchronization processing, controller 21 adds and updates the file (entity data), the file entry information, and the file tree information on optical disk 101 such that the data state managed by virtual file system 35 is reflected in optical disk 101. For example, as to the updated file, the data of the updated file is newly recorded on optical disk 101 as illustrated in FIG. 5. At the same time, the file entry information and the file tree information are updated and newly recorded such that the pre-update original file is renamed to be stored in the trash box folder. As to the erase target file, as illustrated in FIG. 10A, file entry information 63a and file tree information 63b are changed such that the erase target file is stored in the trash box folder on optical disk 101.

As described above, as to the erase of the file, when the synchronization processing is performed to reflect the content of virtual file system 35, only the erase target file is logically erased. That is, the erase target file is only moved to the trash box folder in terms of the management on optical disk 101.

After the synchronization processing, controller 21 refers to the file information in database 33, searches the file for which the erase flag is set to "1", and issues an instruction to storage device 50 to physically erase the searched file (S64). Controller 52 of storage device 50 physically erases the file for which the erase flag is set to "2" on optical disk 101 according to the instruction from controller 21 of information recording device 20. The physically-erased file becomes unreadable (see FIG. 10B).

(1-2-4. File Recording)

Figure 13:
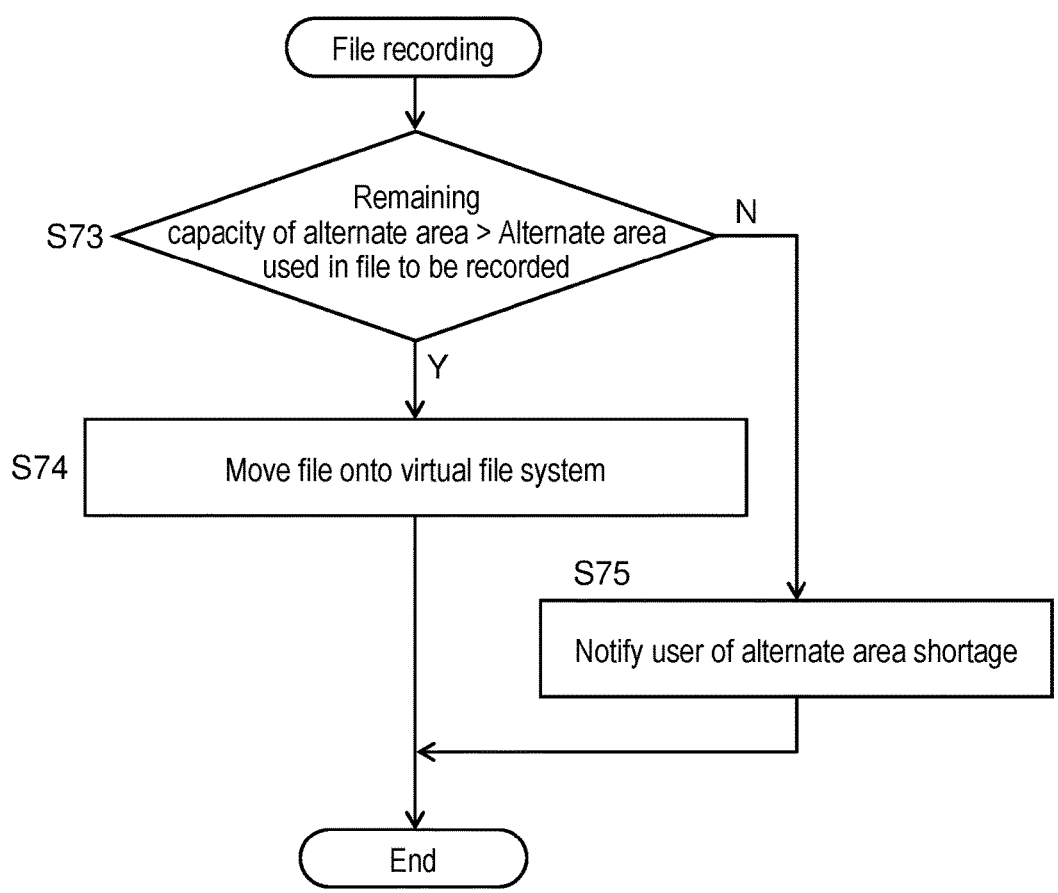
FIG. 13 is a flowchart illustrating target data recording processing in a virtual file system.
Figure 14:
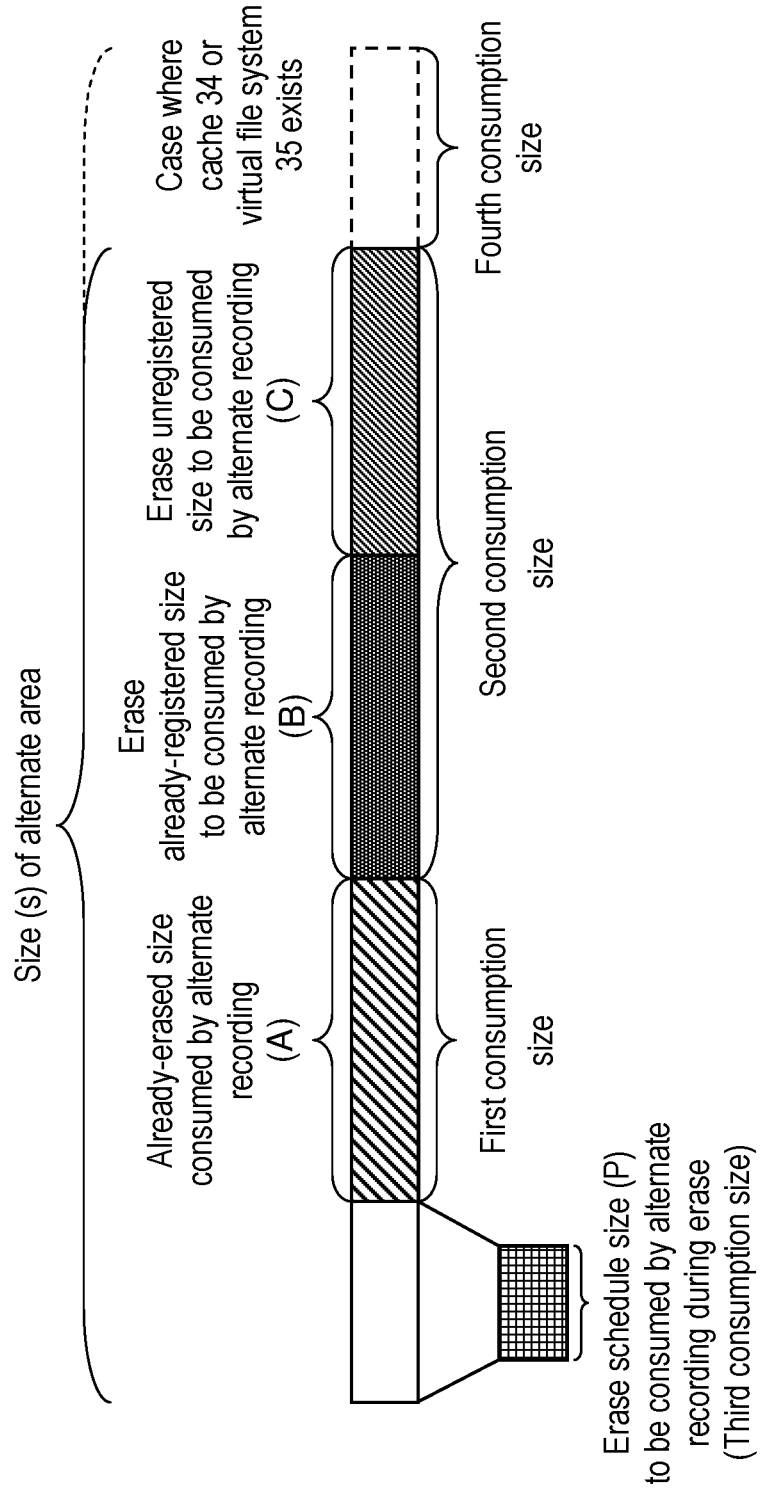
FIG. 14 is a view illustrating a criterion whether target data can be physically erased.

Referring to FIGS. 13 and 14, a file recording method will be described below as an example of a data recording method of information recording device 20.

When recording new data in virtual file system 35, controller 21 refers to the file information in database 33 to determine whether a size of a free alternate area (a free space of an alternate area) is greater than or equal to an estimated size, which is consumed by alternate recording when the target data to be recorded is erased after the recording (S73 in FIG. 13). First, controller 21 calculates an already-erased size (the size of (A) in FIG. 14), a first erase schedule size (the size of (B) in FIG. 14), and a second erase schedule size (the size of (C) in FIG. 14). The already-erased size (the size of (A) in FIG. 14) is one that was consumed when the data was erased from optical disk 101. The first erase schedule size (the size of (B) in FIG. 14) is an estimated size that is to be consumed by the alternate recording when the data having the erase flag "1" scheduled to be erased from optical disk 101 is erased. The second erase schedule size (the size of (C) in FIG. 14) is an estimated size that is to be consumed by the alternate recording when the data having the erase flag "0", which is already recorded in optical disk 101, unerased, and not scheduled to be erased from optical disk 101, is erased. Then, controller 21 calculates a size (the size of S−(A+B+C) in FIG. 14) of a free alternate area in which the already-erased size, the first erase schedule size, and the second erase schedule size are subtracted from a size (the size of (S) in FIG. 14) of the alternate area. Then, controller 21 determines whether the size (the size of S−(A+B+C) in FIG. 14) of the free alternate area is greater than or equal to an erase schedule size (the size of (P) in FIG. 14). The erase schedule size (the size of (P) in FIG. 14) is an estimated size that is to be consumed by the alternate recording when the target data to be recorded is erased after recorded in optical disk 101.

When the size (the size of S−(A+B+C) in FIG. 14) of the free alternate area is greater than or equal to the erase schedule size (the size of (P) in FIG. 14) estimated to be the size, which is consumed by the alternate recording when the target data to be recorded is erased after recorded in optical disk 101 (Y in S73), controller 21 moves the target data to the virtual file system (S74). When the size (the size of S−(A+B+C) in FIG. 14) of the free alternate area is greater than or equal to the erase schedule size (the size of (P) in FIG. 14) (N in S73), controller 21 notifies a user that the size of the free alternate area is short (S75).

Thus, because whether the physical erase can be performed is determined before the recording on the basis of a situation of the free alternate area, the data to be recorded can be recorded on the basis of whether the physical erase is surely performed later on the data to be recorded.

In the first exemplary embodiment, a first consumption size is the size of the alternate area consumed when erasing the data which is recorded and erased already on the write-once optical disk. In this case, the first consumption size becomes the above first erase schedule size.

It is assumed that the data, which is already recorded but not erased yet on the write-once optical disk, is erased from the write-once optical disk; a second consumption size is the size of the alternate area consumed through this erase processing. In this case, the second consumption size becomes a total of the second erase schedule size and the third erase schedule size.

New data is recorded in the write-once optical disk; it is assumed that the new data is recorded in the write-once optical disk once, and that the new data is erased from the write-once optical disk after the recording. In this case, it is assumed that a third consumption size is the size of the alternate area that is consumed to erase the new data.

Thus, in order to record and erase the new data in and from the write-once optical disk, the first and second consumption sizes are subtracted from the size of the alternate area, and the new data can be erased after recorded in the write-once optical disk when the subtraction result is greater than or equal to the third consumption size.

In the case that the information recording device of the present exemplary embodiment includes neither cache 34 nor virtual file system 35 unlike FIG. 2, the information recording device directly records the new data in the write-once optical disk.

On the other hand, in the case that the information recording device includes cache 34 and virtual file system 35, there is a point that should be considered in addition to the above description.

When cache 34 and virtual file system 35 are provided at a preceding stage of the write-once optical disk, there is a possibility of existence of another piece of data, which is not recorded in the write-once optical disk yet although exists on cache 34 or virtual file system 35. It is assumed that the another piece of data is erased after recorded in the write-once optical disk; a fourth consumption size is the size of the alternate area that is consumed through the processing of erasing the another piece of data.

In the case that the new data is recorded in the write-once optical disk, the first, second, and fourth consumption sizes are subtracted from the size of the alternate area, and the new data is recorded in cache 34 or virtual file system 35 when the subtraction result is greater than or equal to the third consumption size.

Then, the data is recorded in the write-once optical disk on the basis of a content of cache 34 or virtual file system 35.

A calculation target of the fourth consumption size does not include the data, which is recorded in and erased from cache 34 or virtual file system 35 before recorded in the write-once optical disk.

In the first exemplary embodiment, the single write-once optical disk is used by way of example. However, the present disclosure is not limited to the first exemplary embodiment. The present disclosure can similarly be implemented even if the write-once optical disk is replaced with a write-once optical disk group including one or a plurality of write-once optical disks.

In the above description, by way of example, a predetermined consumption size is subtracted from the alternate area. However, the content of the exemplary embodiment is not limited to the above description. A value in which the first and second consumption sizes are subtracted from the size of the alternate area may properly be updated. In this case, the subtraction result equivalent to the above description can be obtained by subtracting the third or fourth consumption size from the update value.

Processing of estimating the size of the alternate area consumed in erasing the target data will be described below with reference to FIG. 16, the processing being used to estimate the first erase schedule size (the size of (B) in FIG. 14), the second erase schedule size (the size of (C) in FIG. 14), and the erase schedule size (the size of (P) in FIG. 14). An outline of processing in erasing the target data in an optical disk RAID system, which is a precondition of the estimation, will be described with reference to FIG. 15.

Figure 15:
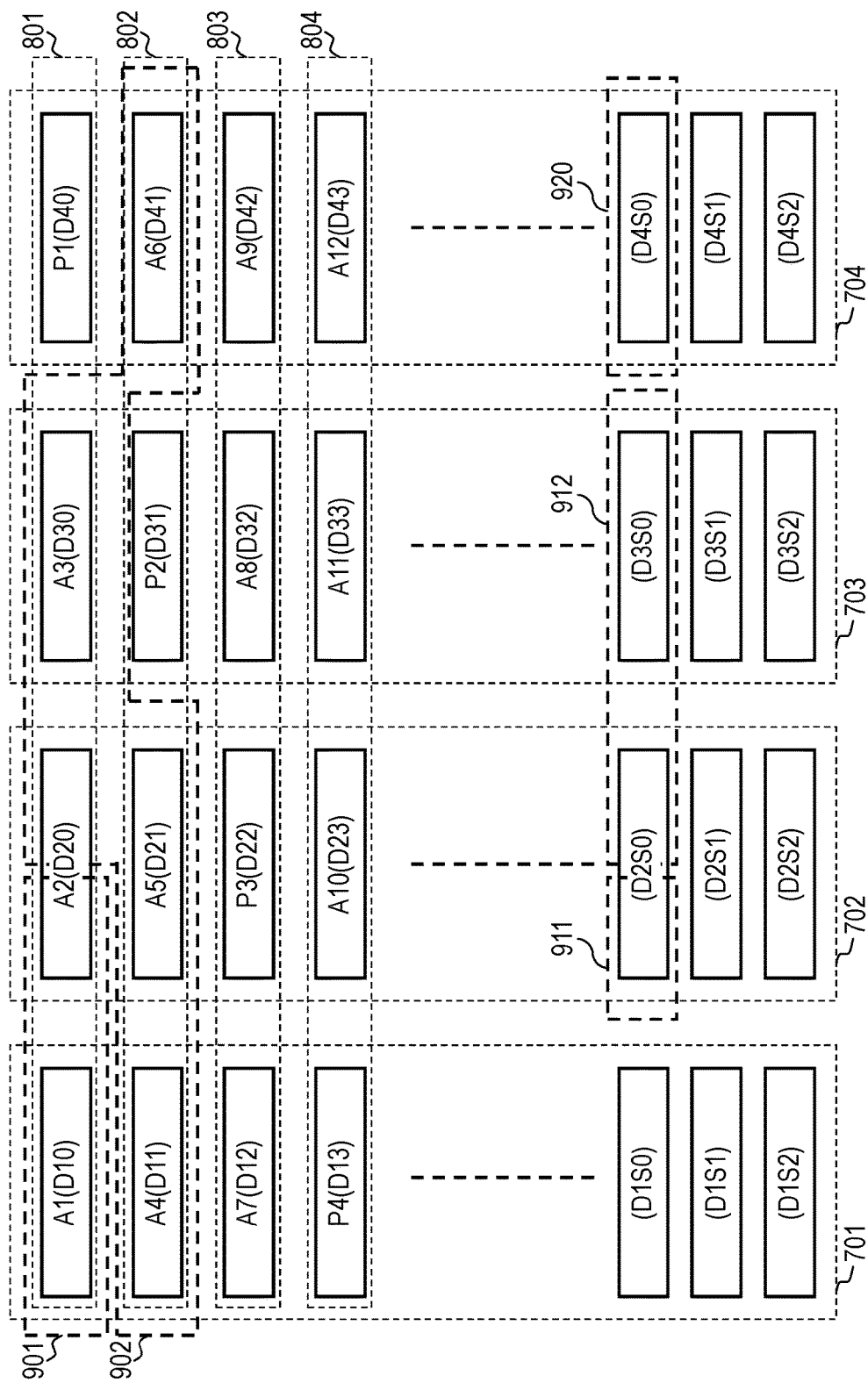
FIG. 15 is a view illustrating an outline of processing when the target data is erased in an optical disk RAID system.

FIG. 15 illustrates a system configuration of RAID 5 in which write-once optical disks 701, 702, 703, 704 are used as an example of the optical disk RAID system. Sectors are disposed on the write-once optical disk. The sector is the data-management minimum unit of the write-once optical disk constituting the RAID system. For example, the sectors having addresses D10, D11, D12, D13 are disposed on optical disk 701. Addresses A1 to A12 are allocated to the RAID system. Addresses P1, P2, P3, P4 are sectors in each of which a parity of error correction information is stored in order to ensure reliability of the data included in another address of a corresponding stripe. Stripes are disposed in the RAID system. The stripe is a unit for ensuring redundancy. For example, stripe 801 includes the sectors of address D10 of optical disk 701, address D20 of optical disk 702, address D30 of optical disk 703, and address D40 of optical disk 704. In the example of FIG. 15, file 1 is recorded in sector group 901, and file 2 is recorded in sector group 902.

That is, the RAID system of the first exemplary embodiment is the write-once optical disk group including the plurality of write-once optical disks.

Sector contents of addresses A2, A3, A4, A5, A6 of the RAID system may be read in the case that file 2 is read from the RAID system. This corresponds to reading of address D11 of optical disk 701, addresses D20, D21 of optical disk 702, address D30 of optical disk 703, and address D41 of optical disk 704. At this point, in the case that address A6 can hardly be reproduced, the RAID system restores and reproduces the content of address A6 from the contents of addresses A4, A5 in stripe 802 belonging to address A6 and the content of parity P2. That is, even if the data is hardly read from one optical disk, the redundancy in which reading becomes possible is ensured in the RAID system.

In the case that file 2 is erased, the sector in which even at least a part of file 2 is recorded is completely overwritten for all the optical disks. The sectors of addresses A2 to A6 in each of which file 2 is stored are overwritten in the example of FIG. 15. The sectors including all the parities of all the stripes in each of which file 2 is included are overwritten when the file 2 is erased. The sector of address P1 of stripe 801 and the sector of address P2 of stripe 802 are overwritten in the example of FIG. 15. In the case that another file is included in the stripe in which file 2 is included, the alternate recording is performed on all the overwritten sectors in the sectors of the stripe. In the example of FIG. 15, file 1 that is of the file except for file 2 is included in stripe 801 in addition to file 2. In the sectors of stripe 801, the alternate recording is performed on the overwritten sectors of addresses A2, A3, P1. Specifically, in the sectors of stripe 801, the alternate recording of the sectors of addresses A2, A3 in each of which file 2 is included is performed on addresses D250, D350 of optical disk 702. At this point, the alternate recording is performed on the sector of address A2 while a part of the sector of address A2 in which file 2 is recorded is completely replaced with data of 00H, and the alternate recording of the data of original file 1 is performed on a part of the sector of address A2 in which file 1 is recorded. In the sector of stripe 801, the alternate recording of the sector including the parity of address P1 is performed on address D450 of optical disk 702. At this point, the alternate recording is performed by re-calculating the parity using the data of the sector subjected to the alternate recording. Thus, in the case that file 2 is erased, the alternate recording is performed on the size of the sector (the sectors of addresses A2, A3) including file 2 and the size of the sector (the size of address P1) including the parity in stripe 801 including file 2 and the data except for file 2, and the alternate area having the same size as the total of these sizes is consumed.

The processing of estimating size X of the alternate area consumed in erasing the target data will be described below with reference to the configuration example in FIG. 15 and a flowchart in FIG. 16. All the stripes including both the target data and the data except for the target data are specified (S81). For example, in the case that the target data is set to file 2 in the configuration of FIG. 15, the corresponding stripe is stripe 801. Then, total X1 of the sizes of the sectors including the pieces of target data of all the stripes specified in S81 is obtained (S82). For example, in the case that the target data is set to file 2 in the configuration of FIG. 15, total X1 is the sizes of two sectors of addresses A2, A3. Total X2 of the sizes of the sectors including the parities of all the stripes specified in S81 is obtained (S83). For example, in the case that the target data is set to file 2 in the configuration of FIG. 15, total X2 is the size of one sector of address P1. Size X of the alternate area to be consumed can be estimated as X=X1+X2 (S84). For example, in the case that the target data is set to file 2 in the configuration of FIG. 15, X is the sizes of three sectors.

More specifically, for example, controller 21 of information recording device 20 calculates the already-erased size from an erased history.

Figure 16:
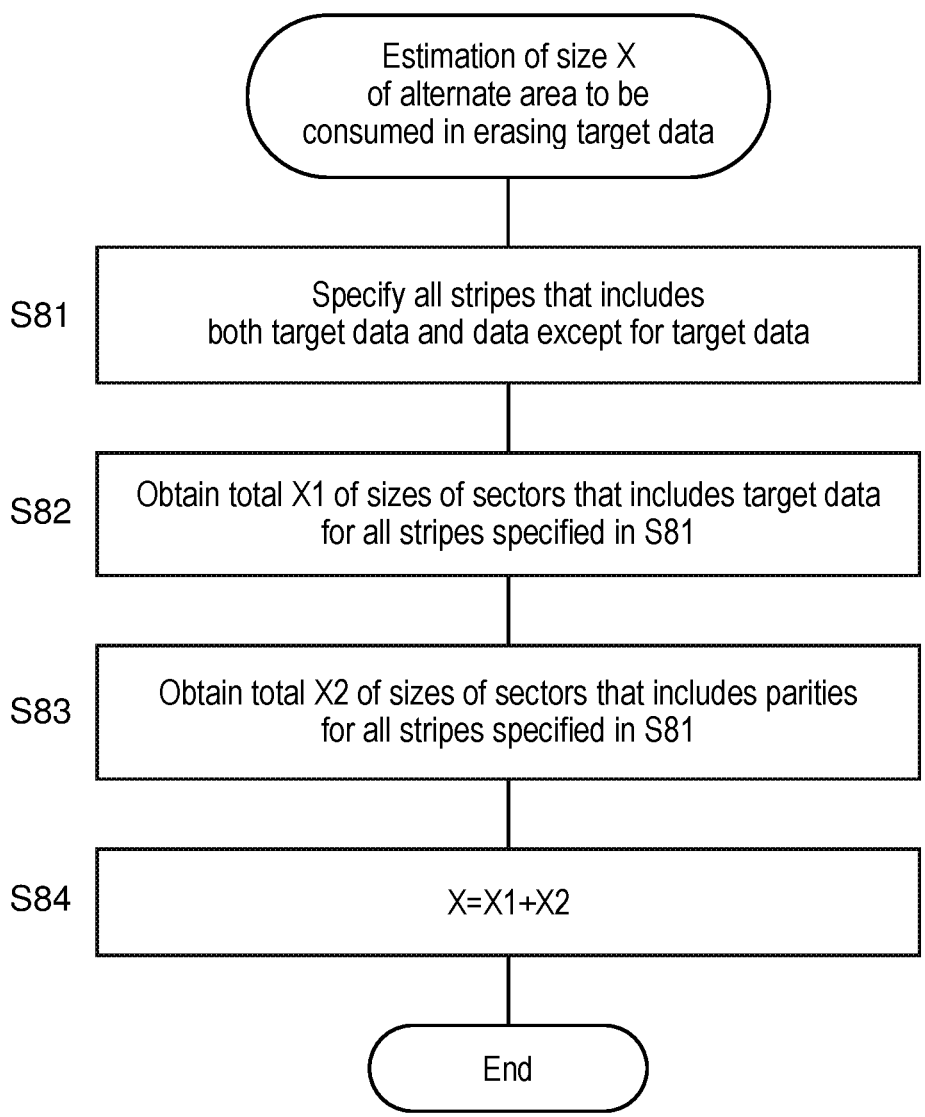
FIG. 16 is a flowchart illustrating processing of estimating a size of an alternate area to be used to erase the target data.

Controller 21 of information recording device 20 estimates the first erase schedule size (the size of (B) in FIG. 14) through the flow in FIG. 16 with the data having the erase flag "1" as the target data. That is, controller 21 specifies all the stripes including both the pieces of data scheduled to be erased from optical disks 701, 702, 703, 704 and the pieces of data except for the pieces of data scheduled to be erased from optical disks 701, 702, 703, 704. Controller 21 calculates the first erase schedule size by adding the total size of the sectors that are of the data-management minimum units including the pieces of data, which are scheduled to be erased from optical disks 701, 702, 703, 704, of all the specified stripes and the total size of the sectors that are of the data-management minimum units including the parities of all the specified stripes.

Controller 21 of information recording device 20 estimates the second erase schedule size (the size of (C) in FIG. 14) through the flow in FIG. 16 with the data having the erase flag "0" as the target data. That is, controller 21 specifies all the stripes including both the pieces of data, which are already recorded in optical disks 701, 702, 703, 704, unerased, and not scheduled to be erased from optical disks 701, 702, 703, 704, and the pieces of data except for the pieces of data, which are already recorded in optical disks 701, 702, 703, 704, unerased, and not scheduled to be erased from optical disks 701, 702, 703, 704. Controller 21 calculates the second erase schedule size by adding the total size of the sectors that are of the data-management minimum units including the pieces of data, which are already recorded in optical disks 701, 702, 703, 704, unerased, and not scheduled to be erased from optical disks 701, 702, 703, 704, of all the specified stripes and the total size of the sectors that are of the data-management minimum units including the parities of all the specified stripes.

Controller 21 of information recording device 20 obtains the size (the size of S−(A+B+C) in FIG. 14) of the free alternate area by subtracting the known already-erased size (the size of (A) in FIG. 14), the first erase schedule size (the size of (B) in FIG. 14), and the second erase schedule size (the size of (C) in FIG. 14) from the size (the size of (S) in FIG. 14) of the known alternate area.

Controller 21 of information recording device 20 estimates the erase schedule size (the size of (P) in FIG. 14) through the flow in FIG. 16 while setting the data scheduled to be recorded in optical disks 701, 702, 703, 704 to the target data. That is, controller 21 specifies all the stripes including both the target data scheduled to be recorded in optical disks 701, 702, 703, 704 to the target data and the pieces of data except for the target data scheduled to be recorded in optical disks 701, 702, 703, 704. Controller 21 calculates the erase schedule size (the size of (P) in FIG. 14) by adding the total size of the sectors that are of the data-management minimum units including the pieces of target data scheduled to be recorded in optical disks 701, 702, 703, 704, of all the specified stripes and the total size of the sectors that are of the data-management minimum units including the parities of all the specified stripes.

On the basis of these estimations, controller 21 of information recording device 20 determines whether the physical erase can be performed from the situation of the free alternate area before the recording of the data to be recorded. Therefore, controller 21 can record the data to be recorded after determining whether the physical erase of the data can surely be performed (see S73 in FIG. 13 and FIG. 14).

The fourth consumption size should be considered in the case that the information recording device includes cache 34 and virtual file system 35. The fourth consumption size can be estimated similarly to the first erase schedule size (the size of (B) in FIG. 14), the second erase schedule size (the size of (C) in FIG. 14), and the erase schedule size (the size of (P) in FIG. 14).

(1-3. Effect and the Like)

As described above, the information recording device of the first exemplary embodiment is the information recording device that records the information in the write-once optical disk group. The write-once optical disk group includes one or a plurality of write-once optical disks. In recording the new data, the controller calculates the residual quantity of the alternate area, the calculation of the residual quantity of the alternate area corresponding to the subtraction of the first and second consumption sizes from the size of the alternate area of the write-once optical disk group. The residual quantity of the alternate area and the third consumption size are compared to each other, and the information recording device records the new data when the residual quantity is greater than or equal to the third consumption size.

The information recording device directly records the new data in the write-once optical disk group when the information recording device does not include the storage such as the cache and the virtual file system.

On the other hand, in the case that the information recording device includes the storage such as the cache and the virtual file system, the information recording device calculates the residual quantity of the alternate area, the calculation of the residual quantity of the alternate area corresponding to the subtraction of the first, second, and fourth consumption sizes from the size of the alternate area of the write-once optical disk group. The residual quantity and the third consumption size are compared to each other, and the information recording device records the new data in the storage when the residual quantity is greater than or equal to the third consumption size. Then, the data of the storage is reflected in the write-once optical disk group.

In the present disclosure, whether the data is actually erased after recorded in the write-once optical disk group can be determined in recording the data in the write-once optical disk group. Therefore, the occurrence of the problem in that the data is hardly erased after recorded in the write-once optical disk group can be suppressed.

Additionally, the present disclosure can properly correspond to both the case the information recording device includes the storage such as the cache and the case that the information recording device does not include the storage.

Other Exemplary Embodiment

The first exemplary embodiment is described above as an illustrative example of the technology disclosed in the present disclosure. The technology of the present disclosure is not limited to the first exemplary embodiment, but the technology can also be applied to exemplary embodiments in which the change, replacement, addition, and omission are suitably performed. A new exemplary embodiment can also be made by a combination of the components of the first exemplary embodiment.

Other exemplary embodiments will be exemplified below.

In the first exemplary embodiment, controllers 21 and 52 are the CPU or MPU that implements a predetermined function in conjunction with software. Alternatively, controllers 21 and 52 may be realized a dedicated electronic circuit designed to implement the predetermined function. That is, controllers 21 and 52 can be realized the CPU, the MPU, a DSP, an FPGA, and an ASIC.

In the first exemplary embodiment of FIG. 1, for convenience, storage device 50 includes only one optical disk 101. Alternatively, storage device 50 may accommodate a plurality of optical disks therein, and switch the optical disk loaded on optical disk drive 56 using changer 54.

In the first exemplary embodiment, the present disclosure is applied to the information recording device by way of example. However, the present disclosure is not limited to the information recording device. The present disclosure can be implemented as an information recording method in which the information recording device is used. In this case, the information recording method can be performed with each of the pieces of processing performed by controllers 21 and 52 as a step.

As described above, the exemplary embodiments are described above as an illustrative example of the technology disclosed in the present disclosure. For this reason, the accompanying drawings and the detailed description are provided.

The constituents described in the accompanying drawings and detailed description can include not only the component necessary for the solution of the problem but also the component, which is not necessary for the solution of the problem but simply illustrates the technology Therefore, it is noted that the unnecessary component is not immediately recognized to be necessary even if the unnecessary component is illustrated or described in the accompanying drawings and the detailed description.

Because the above exemplary embodiments are used to illustrate the technology of the present disclosure, various changes, replacements, additions, and omissions can be made in claims or a range equivalent to the claims.

What is claimed is:

1. An information recording device that records information in a write-once optical disk group, the write-once optical disk group including one or a plurality of write-once optical disks, the information recording device comprising:
   a controller that controls recording and erase of data in and from the write-once optical disk group,
   wherein the controller, when new data are being recorded in write-once optical disk group:
calculates a first consumption size, the first consumption size being a size of an alternate area of the write-once optical disk group already consumed when past data recorded in the write-once optical disk group was erased;
   calculates a second consumption size, the second consumption size being an estimated size of the alternate area to be consumed when current data recorded in the write-once optical disk group will be erased;
   calculates a third consumption size, the third consumption size being an estimated size of the alternate area to be consumed when the new data, if recorded, will be erased from the write-once optical disk group after recorded in the write-once optical disk group;
   calculates a residual quantity of the alternate area, the calculation of the residual quantity of the alternate area corresponding to a subtraction of the first consumption size and the second consumption size from a size of the alternate area; and
   records the new data when the residual quantity is greater than or equal to the third consumption size.

2. The information recording device according to claim 1, wherein the controller directly records the new data in the write-once optical disk group when the residual quantity of the alternate area is greater than or equal to the third consumption size.

3. An information recording device that records information in a write-once optical disk group, the write-once optical disk group including one or a plurality of write-once optical disks, the information recording device comprising:
   a controller that controls recording and erase of data in and from the write-once optical disk group, and
   a storage in which the data recorded in the write-once optical disk group and the data to be recorded in the write-once optical disk group are temporarily stored,
   wherein the controller, when new data are being recorded in write-once optical disk group:
calculates a first consumption size, the first consumption size being a size of an area of the write-once optical disk group already consumed when past data recorded in the write-once optical disk group was erased;
   calculates a second consumption size, the second consumption size being an estimated size of the alternate area to be consumed when current data recorded in the write-once optical disk group will be erased;
   calculates a third consumption size, the third consumption size being an estimated size of the alternate area to be consumed when the new data is, if recorded, will be erased from the write-once optical disk group after recorded in the write-once optical disk group;
   calculates a forth consumption size, the fourth consumption size being an estimated size of the alternate area to be consumed when temporary data temporarily stored in the storage and not yet recorded in the write-once optical disk group is erased after recorded in the write-once optical disk group:
   calculates a residual quantity of the alternate area, the calculation of the residual quantity of the alternate area corresponding to a subtraction of the first consumption size, the second consumption size, and the forth consumption size from a size of the alternate area; and
   records the new data when the residual quantity is greater than or equal to the third consumption size.

4. The information recording device according to claim 3, wherein the controller excludes data erased from the storage from a calculation target of the fourth consumption size before recording data in the write-once optical disk group.

5. The information recording device according to claim 3, wherein
   the write-once optical disk group includes the plurality of write-once optical disks,
   the controller manages the write-once optical disk group in a unit of a stripe spreading over the plurality of write-once optical disks, records data and error correction information about the data in the stripe, and controls the write-once optical disk group as one virtual recording medium, and
   the controller calculates the first consumption size based on the stripe in which both the past data, which is already recorded in and erased from the write-once optical disk group, and another piece of data are recorded.

6. The information recording device according to claim 5, wherein
   the stripe is constructed in units of sectors dispersed in the plurality of write-once optical disks, and
   the controller calculates the first consumption size based on a size of a sector in which error correction information about the stripe is recorded and a size of a sector in which both the past data, which is recorded in the write-once optical disk group and already erased, and another piece of data are recorded in the stripe.

7. The information recording device according to claim 5, wherein, when the current data recorded in the write-once optical disk group is erased, the controller estimates the second consumption size based on the stripe in which both the current data to be erased and another piece of data are recorded.

8. The information recording device according to claim 5, wherein, when the new data newly recorded in the write-once optical disk group is erased from the write-once optical disk group, the controller estimates the third consumption size based on the stripe in which both the new data and another piece of data are recorded.

9. An information recording method for recording information in a write-once optical disk group, the write-once optical disk group being one or a plurality of write-once optical disks, the information recording method comprising:
  calculating a first consumption size, the first consumption size being a size of an alternate area of the write-once optical disk group already consumed when past data recorded in the write-once optical disk group was erased;
  calculating a second consumption size, the second consumption size being an estimated size of the alternate area to be consumed when current data recorded in the write-once optical disk group will be erased;
  calculating a third consumption size, the third consumption size being an estimated size of the alternate area to be consumed when new data, if recorded, will be erased from the write-once optical disk group after recorded in the write-once optical disk group;
  calculating a residual quantity of the alternate area, the calculation of the residual quantity of the alternate area corresponding to a subtraction of the first consumption size and the second consumption size from a size of the alternate area; and
  recording the new data when the residual quantity is greater than or equal to the third consumption size.

10. An information recording method for recording information in a write-once optical disk group, the write-once optical disk group being one or a plurality of write-once optical disks, the information recording method comprising:
  calculating a first consumption size, the first consumption size being a size of an alternate area of the write-once optical disk group already consumed when past data recorded in the write-once optical disk group was erased;
  calculating a second consumption size, the second consumption size being an estimated size of the alternate area to be consumed when current data recorded in the write-once optical disk group will be erased;
  calculating a third consumption size, the third consumption size being an estimated size of the alternate area to be consumed when new data, if recorded, will be erased from the write-once optical disk group after recorded in the write-once optical disk group;
  calculating a forth consumption size, the fourth consumption size being an estimated size of the alternate area to be consumed when temporary data temporarily stored in the storage and not yet recorded in the write-once optical disk group is erased after recorded in the write-once optical disk group;
  calculating a residual quantity of the alternate area, the calculation of the residual quantity of the alternate area corresponding to a subtraction of the first consumption size, the second consumption size, and the forth consumption size from a size of the alternate area; and
  recording the new data when the residual quantity is greater than or equal to the third consumption size.

\* \* \* \* \*